June 30, 1970  J. S. EATON  3,517,841
COMBINATION DRAGLINE AND MATERIAL FEEDER AND LOADING UNIT
Filed Feb. 14, 1968  7 Sheets-Sheet 1

INVENTOR
Jay S. Eaton
BY Gustave Miller
ATTORNEY

INVENTOR
Jay S. Eaton
ATTORNEY

3,517,841
COMBINATION DRAGLINE AND MATERIAL FEEDER AND LOADING UNIT

Jay S. Eaton, c/o Dixie Asphalt Company, P.O. Box 6308, West Palm Beach, Fla. 33405
Filed Feb. 14, 1968, Ser. No. 705,454
Int. Cl. B65g 67/08
U.S. Cl. 214—93     15 Claims

ABSTRACT OF THE DISCLOSURE

This invention is a combination dragline and material feeder and loading unit and method and reversible vibrating feeder wherein the dragline collects material from the cut by using a scraper bucket whose loaded weight is greater than the lifting capacity of the dragline, but whose empty weight is liftable by the dragline, to collect the material from the cut and then drag it over the intervening area to deposit it on a material feeder platform without having lifted the material, then returning the bucket to the cut to repeat the cycle, and then, simultaneous with the next dragline cycle, vibrating the feeder platform to feed the material deposited thereon to an elevating mechanism at a selected transverse end of the platform to elevate it for gravity delivery to a truck. The conventional dragline cycle of "hoist, swing, dump and return to the cut" is eliminated in favor of a dragline cycle of merely scraping the cut and drag it to the feeder and then bring it back to the cut to quickly repeat the shortened cycle, and then, simultaneous with the next dragline cycle, cycling the loading of the material by operating the platform to feed the material to an elevator mechanism, at one selected transverse end of the platform, which then positions the material for gravity delivery to a truck or spoil area. The dragline, using a larger than normal scraper bucket and eliminating the hoist and dump steps from its cycle, greatly increases is production to possibly double or more than its normal capacity.

OBJECTS OF INVENTION

This invention relates to a dragline and has for an object to combine a material load feeding unit with a dragline so as to eliminate the lifting and dumping steps from the dragline cycle, and confine the dragline cycle to scraping and collecting material from the cut, then dragging it to a platform of a load feeder unit, without having lifted the load, then returning the scraper back to the cut to repeat the cycle, while simultaneously cycling the feeder unit to feed the material scraped thereon by the dragline to an elevator for gravity delivery to a truck or spoil area, thus greatly increasing the production of the dragline.

A further object of this invention is to eliminate the lifting and dumping or loading steps from the operating cycle of a dragline and provide a load feeding unit combined therewith which will provide the necessary loading cycle, which loading cycle will be simultaneous with the dragline cycle thus greatly increasing the capacity of the dragline.

A further object of this invention is to provide a reversible load feeder unit for a dragline wherein the dragline may drag rather than lift the material onto the load feeder unit, and wherein the material is dragged over a ramp onto a platform, thus eliminating lifting of the load by the dragline bucket, and permitting a scraper bucket of much larger capacity than a bucket which has to be lifted with the load, hence increasing the capacity of the dragline.

Still a further object of this invention is to provide reversible means for causing the load feeder unit platform to be actuated to feed the load thereon to an elevator mechanism at either selected transverse end of the platform for gravity delivery to a succession of trucks for carrying it away or depositing in dikes or spoil areas.

A further object of this invention is to provide a platform actuating mechanism in the form of a reversible vibrator for agitating the platform to selectively feed the load thereon to either transverse end.

A further object of this invention is to resiliently support the load receiving and feeding paltform, and to selectively resiliently support either end of the platform so as to move the material toward the feeding end for faster feeding.

A further object of this invention is to provide a combined shroud for the platform having both a ramp leading up to it and including a funnel from the shroud to the platform, the funnel having either transverse end portion selectively adjustable in height over the feeder platform to control the rate of flow of material thereunder to the elevator mechanism at the feeding end thereof.

A further object of this invention is to provide a material receiving and load feeding platform and platform base which is hingedly, adjustably and detachably secured to the crawler or truck frame of the dragline so that the same load feeder unit may be attached to different dragline outfits. Various capacity units will be required for various capacity draglines.

Still a further object of this invention is to provide a load feeder unit which may be readily dragged to a new location by the crawler to which it is hingedly attached, and which may be readily lifted off the ground when moved by the crawler in the opposite direction to prevent it plowing into the ground on the rare occasions it may have to be moved in such opposite direction.

A further object of this invention is to provide a material elevating mechanism which is readily attachable to and detachable from the platform base so that it may be picked up by the dragline for movement to a new location when the dragline is moved from a completed area of the cut to a new area so that the entire dragline and loader unit may readily be moved in operation without the need of any additional moving apparatus.

Yet a further object of this invention is to provide an elevating mechanism which is readily adjustable in size as needed, and further which includes a truck gravity material delivery means having a divertible delivery spout so that a second truck can start to load immediately that loading of the prior truck is completed without waiting for the prior truck to be moved away, thus speeding up the operation.

Still a further object of this invention is to provide a self-leveling attaching means between the elevating mechanism and the feeder platform base which is also quickly attachable or detachable.

Brief description of invention

In brief, this invention is a conventional dragline with a larger than normal scraper bucket attached to the boom, in combination with a load feeder unit hingedly yet detachably secured to the dragline crawler by adjustable arms, the load feeder unit including a base on which is resiliently yet adjustably supported a load feeder platform. Reversible vibrator means is provided for actuating the feeder platform to selectively feed the load of material scraped thereon by the dragline scraper bucket to one transverse end of an elevating mechanism, detachably mounted on the base by a self leveling means, for raising the collected material to a double spout for gravity delivery to a truck under either spout of the double spout, so that an empty truck may be in position to commence being filled as soon as the prior truck is filled, without waiting for the prior truck to move away, thus expediting the operation or dumping in a pile or spoil area. The load feeder unit includes a material receiving platform mounted by an adjustable resilient means on a base and operable by a reversible vibrator secured to the underside thereof operable by a motor mounted on a support bridge on arms extending from the base adjustably hinged to the dragline crawler. A combined ramp and funnel shroud connects the surrounding area surface to the feeder platform so that the dragline scraper bucket can drag the material up over the ramp to the funnel above the platform. Heating means under the platform keep the collected material fluent when wet or gummy. In addition, transverse ends of the feeder platform are each provided with an adjustable door to close off the non-delivery transverse end of the feeder platform, and to provide an opening of adjustable size at the delivery transverse end to control the rate of delivery from the platform to the elevator mechanism. The invention includes a method of scrapingly collecting material from a cut and dragging it to a load feeder platform, without lifting the load at all in the bucket, then returning the scraper bucket to the cut area to repeat the cycle, and also having a simultaneous cycle of loading the material from a material receiving feeder platform to an elevating mechanism for gravity delivery to a truck, and to commence loading a second truck while the prior truck is still in the process of moving away from the gravity loading means.

Brief description of figures

With the above and related objects in view, this invention consists in the details of construction and combination of parts, as will be more fully understood from the following description, when read in conjunction with the accompanying drawing, in which.

Detailed description of invention

There is shown at 10 the combination dragline and material load feeder unit of this invention. This invention 10 includes a conventional dragline 12 including a boom 14 rotatable on a carriage 16 mounted on a crawler 18, the crawler including conventional endless tracks 28. The usual bucket hoist line 20 extends over the boom 14 and is controlled by the operator in the control cabin 22. A bucket 24 is supported on the hoist line 20 and is further controlled by the bucket dragline 26. The dragline 10 thus far described is completely conventional, except that the particular bucket 24 used in this combination is a scraper bucket of substantially larger size than normally used with the particular size of dragline. Draglines are of many sizes, and so are their buckets as well as the scraper buckets that may be used therewith. Every particular dragline size has a particular maximum size of scraper bucket that may be used therewith, the size being limited by the fact that the usual dragline cycle consists of "scrape, hoist, swing, dump and return to the cut." The hoisting ability of the dragline is usually limited by the combined weight of the scraping bucket and the load of material carried thereby.

In this invention, the load is never hoisted or lifted by the dragline, only the empty bucket weight need be hoisted or lifted at any time, hence a larger than usual maximum scraping bucket is used, for the cycle of this invention is "scrape the cut, drag to the load feeding area, dump without lifting, then return to the cut." In this invention, at most only the empty scraping bucket may need to be lifted, hence the empty weight of the scraper bucket used in this invention may equal the loaded weight of the conventionally used bucket, so obviously, a much larger scraper bucket may be used in this invention than in the conventional use of the dragline.

Figure 1:
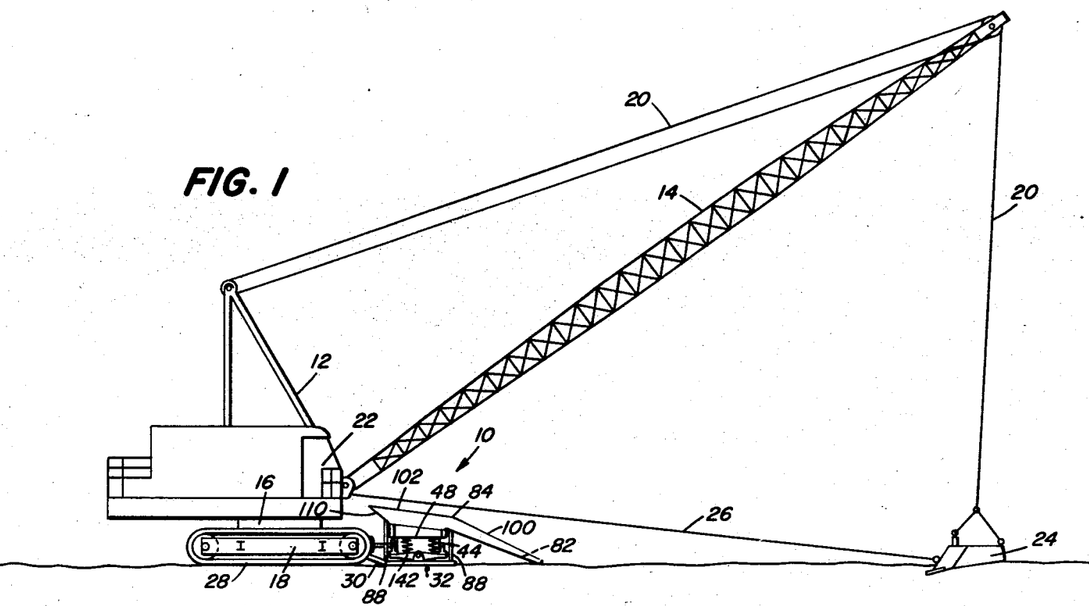
FIG. 1 is a side elevational view of the combination dragline and load feeder unit of this invention, with the elevating mechanism 80 omitted therefrom.
Figure 2:
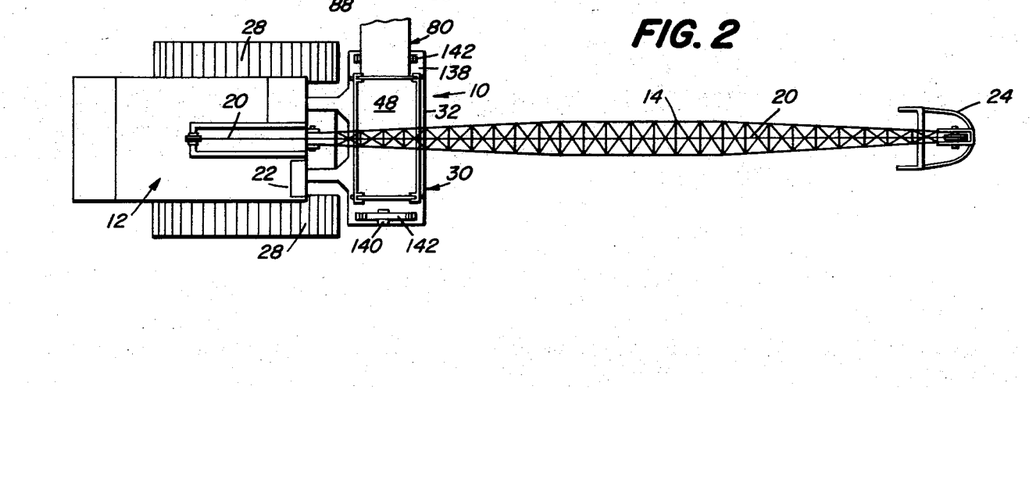
FIG. 2 is a top plan view of FIG. 1, but with shroud 84 omitted therefrom.
Figure 3:
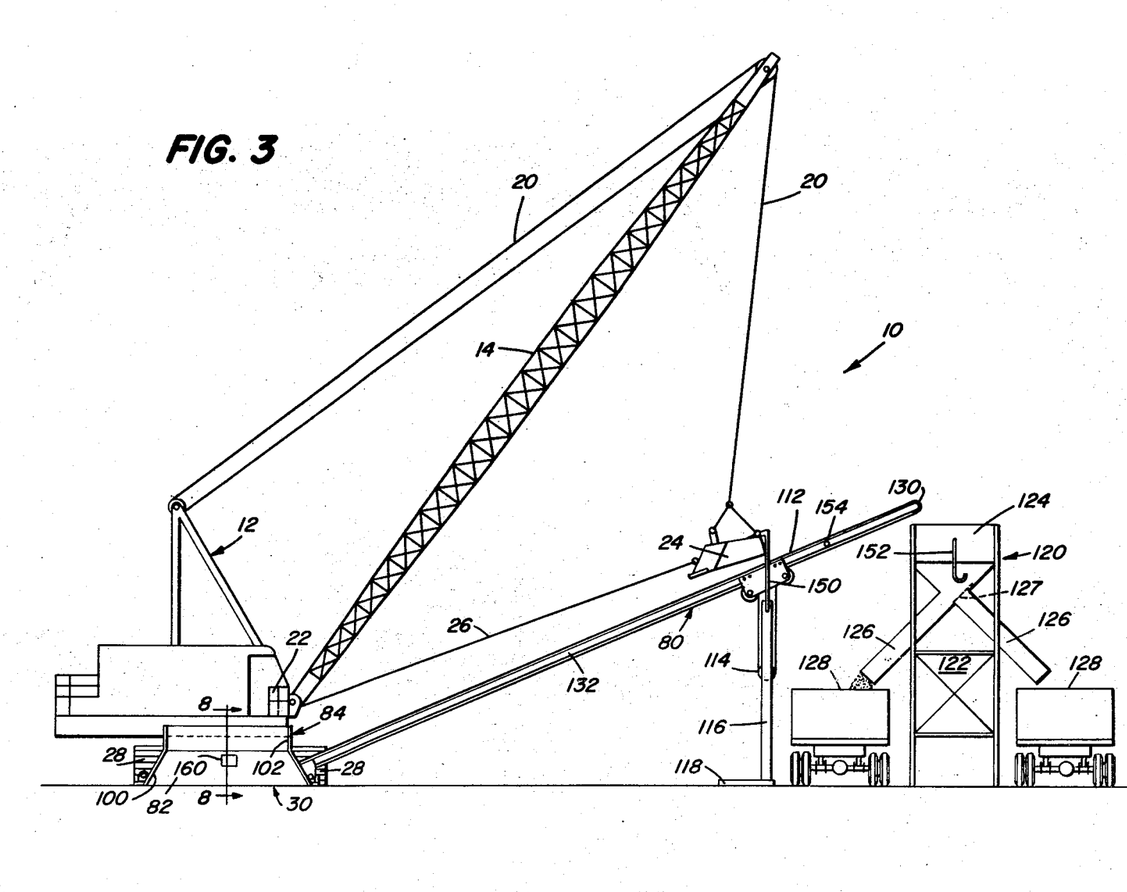
FIG. 3 is a side elevational view, with the crawler rotated at 90° to the position shown in FIG. 1, and showing the elevating mechanism.
Figures 4, 4A:
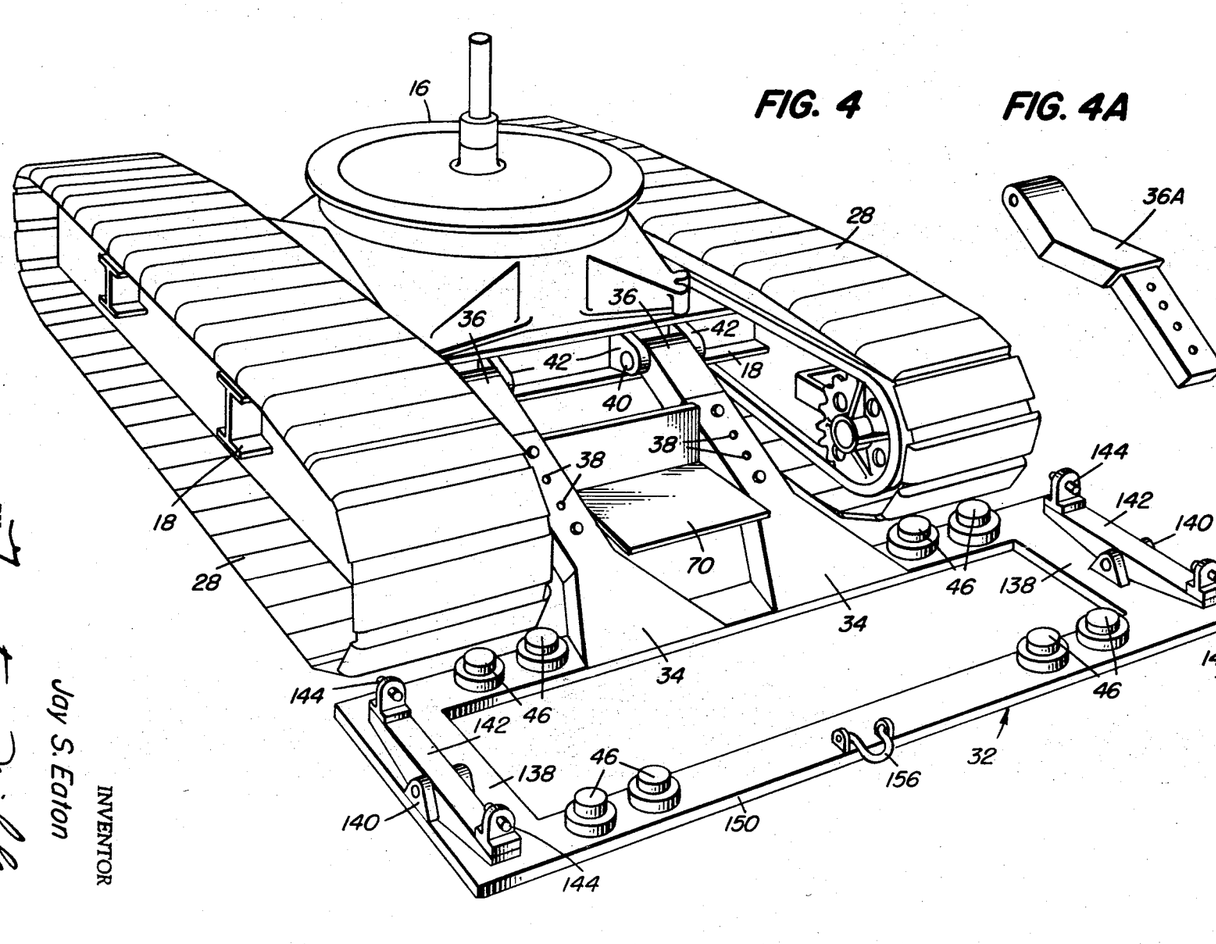
FIG. 4 is a perspective view, on a larger scale, of the dragline crawler and carriage and the hingedly adjustably attached platform base and self leveling elevating mechanism support pivot arms.
FIG. 4A shows a modified hinging arm.

The reversible load feeder 30 forming part of the scraper bucket may be used in this invention than in the in FIG. 4 to be essentially a rectangular plate of substantial strength and thickness. Integrally extending from one long side of the load feeder base 32 are a pair of substantial arms 34 which are hingedly secured to the crawler 18 by means of readily exchangeable extending arms 36 telescopically complementary thereto, even though rectangular in cross section, the extending arms 36 being adjustably secured to the integral arms 34 by any suitable means such as bolts and nuts 38. The ends of the extending arms 36 are hingedly mounted on the crawler 18 by removable hinge pins 40 extending therethrough and through spaced hinge ears 42 on the carriage 16. The extending arms 36 may be straight as shown in FIG. 4, or may be offset, as in the arm 36A shown in FIG. 4A.

The arms 36A are provided in mirror image pairs, and the offset may be of various degrees. As a result, the load feeder base 32, and thus the load feeder 30, may be attached to practically any existing dragline 12 of any size after welding appropriate hinge ears 42 to its carriage 16.

Resiliently supported by springs 44, here shown as eight in number, on flanged pads 46 integrally mounted on rectangular base 32 is a material or load feeder platform 48. Similar pads 50 are provided on the bottom of the platform 48. When the springs 44 are all of equal height and strength, the feeder platform 48 will be supported parallel to the base 32 when at rest, but by using weaker or shorter springs on one side of the center toward either adjacent transverse end, the platform 48 will necessarily slant toward such adjacent end. Suitably yet removably secured to the bottom of the platform 48 is a commercially available vibrator 52 shown in more detail in FIGS. 10, 11 and 12. One suitable commercial vibrator is illustrated on pages 2, 9 and 10 of a brochure TELSMITH "Operation, Maintenance and Parts Manual for Vibrating Feeders and Grizzly Feeders" of Smith Engineering Works (Div. of Barber-Greene) Milwaukee 1. Wis. Another Vibrating Feeder and Adjustable Grizzly is made by Iowa Manufacturing Co. of Cedar Rapids, Iowa. Another available feeder is known as the Syntron Model F–55 magnetic reversible vibrating feeder.

Figure 10:
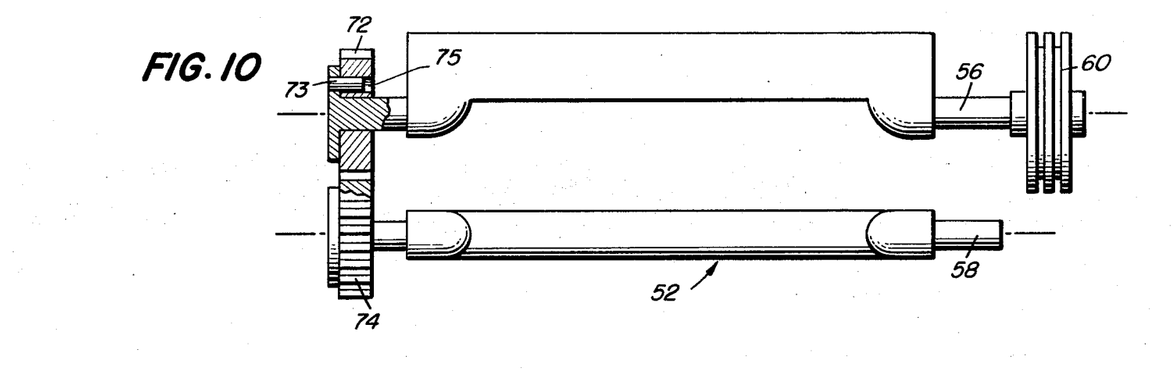
FIG. 10 is a detail, partly sectional, view of a vibrator mechanism for actuating the feeder platform.
Figure 11:
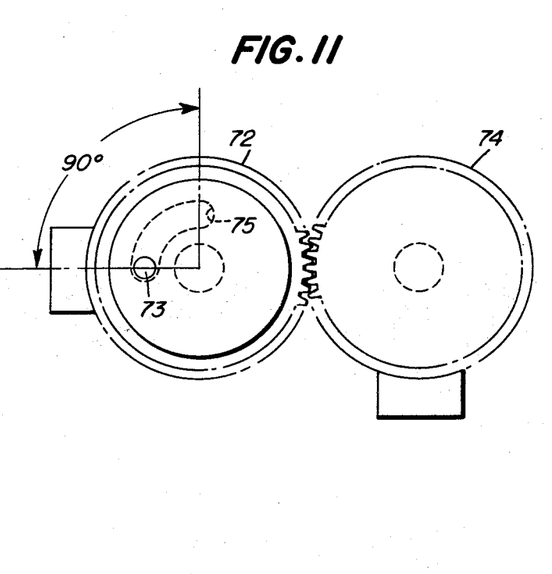
FIG. 11 is a detail view looking toward the left end of the vibrator mechanism of FIG. 10.
Figure 12:
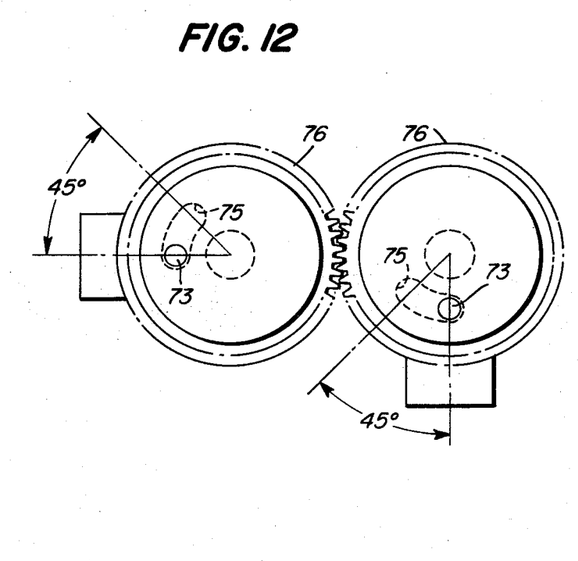
FIG. 12 is a modified form of FIG. 11.

As shown in FIGS. 10, 11 and 12, the reversible vibrator 52 includes a housing 54 securely but detachably fastened to the bottom of the platform 48. Journaled in the housing 54 are a pair of eccentrically weighted shafts 56 and 58. At one end, one of the shafts has a pulley 60 for receiving an operating belt 62 which is operatively mounted on a similar pulley 64 on the shaft 66 of a reversible motor 68 supported on a bridge 70 supported on the integral arms 34 extending from feeder base 32.

Two eccentrically weighted shafts 56 and 58 are adjustably geared together for simultaneous rotation by meshed gears 72 and 74. In FIG. 10 and FIG. 11, the gear 74 is fixed on its shaft 58, while the gear 72 may be adjusted 90°. These gears 72 and 74, as well as the gears 76 in FIG. 12, are self-adjusting when the motor 68 in reversed. Reversal of the motor 68 causes the feed platform to change its direction of feed, and feed the material dumped or scraped onto it to the opposite end.

When the reversible motor 68 is operated in the opposite direction, it will first cause the gears 72 and 74, or the gears 76, to rotate in the opposite direction and thus cause the shaft pins 73 to travel to the opposite ends of the slots 75 for a total travel of 90°. Then, as the motor 68 continues to rotate, the eccentrical center of gravity of the shafts carrying the eccentric weights is thus offset 90° and the vibrating platform 48 then feeds in the opposite direction. This makes it possible to change the direction of feed by the platform 48 by merely reversing the motor 68.

While the eccentric weights are shown as being integrally a part of the shafts, it is obvious that the eccentrical weights may be separately made and removably added to the shafts, and also, that additional weights may be added as found desirable.

In FIG. 12, both gears 76 and 78 are adjustable 45° each, or the same total relative adjustment of 90°. The rotation of the eccentrically weighted shafts 56 and 58 causes the vibrated platform to feed the material load thereon toward one transverse end or the other, depending on the setting of the eccentric weights relative to each other. In operation, the centrifugal forces of the two shafts act together, and in the same direction, at two points during rotation, and in opposite directions, counteracting one another at all other points in rotation. This produces substantially a straight line reciprocating motion which is at 45° to the plane of the feeding surface of the platform 48. The material is propelled upward and forward at an angle of 45°. Counterweights of different sizes may be installed on the shafts to vary the throw of the feeder platform 48.

The material feeder platform 48 being subject to wear by the material dragged thereon by the dragline 12, may be replaced as needed and the vibrator housing 54, with its vibrator 62 is therefore detachably secured thereto in any suitable manner. Likewise detachably secured to the feeder platform 48 is a resistance electrical heater 78 preferably of heavy construction conventionally consisting of resistance material within piping, one type thereof being commercially available as a "CALROD" heater. Such heater 78 is operated when the material is wet or gummy, and serves to keep the material fluent so that it may readily feed along the platform, when being vibrated, to an elevating mechanism 80.

The material is first scraped from the cut by the scraper bucket 24 and dragged over the intervening ground surface without being lifted, up a ramp 82 of a shroud 82 and through a funnel 86 to be deposited on the feeder platform 48. Having deposited its load, the bucket 24 is then quickly returned by the boom 30 and bucket line 20 to the cut to repeat the cycle, either on the surface or lifted through the air, for the weight of the empty scraper bucket 24 is within the lifting capacity of the boom 30 although its loaded weight may well exceed the lifting capacity of the boom 30.

Figure 9:
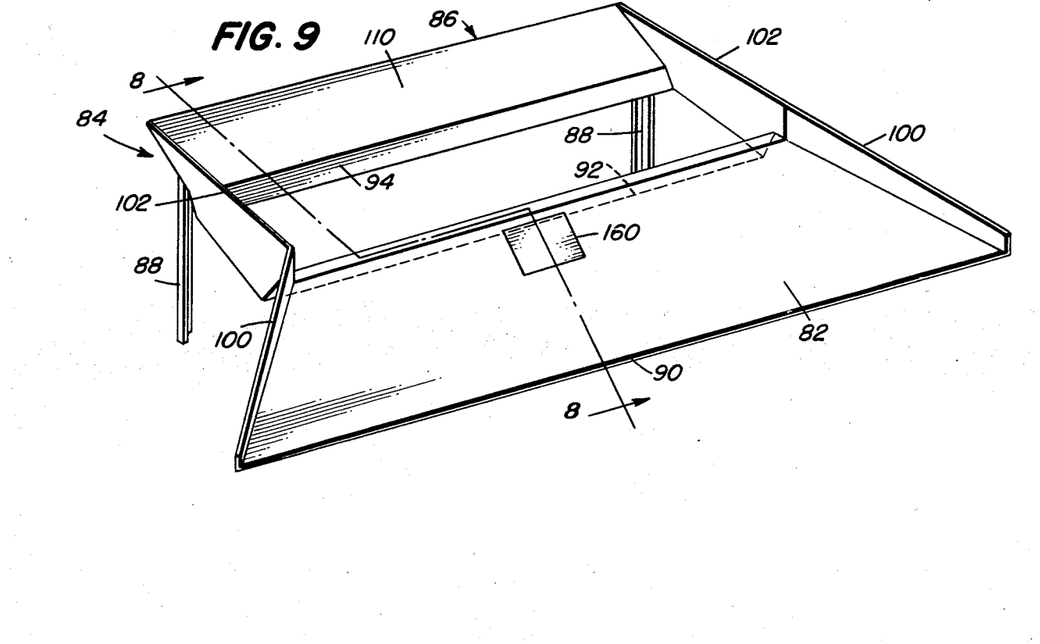
FIG. 9 is a perspective view of the combined ramp and funnel shroud.

The ramp 82 and the funnel 86 are integral with the shroud 84. The shroud 84 is supported over the feed platform 48 by means of four rear legs 88, which may be telescopically adjustable if desired, and the forward edge 90 of the ramp 84, with its front and rear funnel sides 92 and 94 extending within a short front wall 96 and a higher rear wall 98 integral with the feeder platform 48. The ramp 82 has two converging end walls 100 merging, at the same angle, with the parallel funnel transverse walls 102, the angle between each ramp wall 100 and its merging funnel wall 102 being the same. The feeder platform confronting front and back walls 96 and 98 are each provided with spaced confronting tracks 106 for adjustably receiving a door 108 for closing off the non-feeding transverse end of feeder platform 48 and for adjusting the size of the opening through which the material on the platform 48 feeds to the elevating mechanism 80, thus assuring optimum feed and even distribution of the material on the belt conveyor 112. Stud bolts 104 through apertures in walls 96 and 98 between the tracks 106 and complementary recesses 109 in the vertical ends of the doors 108 serve to secure the door 108 in closed position at the non-feeding end of the platform 48 and to secure the door 108 in the open adjusted position in the feeding transverse end of platform 48 to the belt conveyor 112.

Figures 5, 9A:
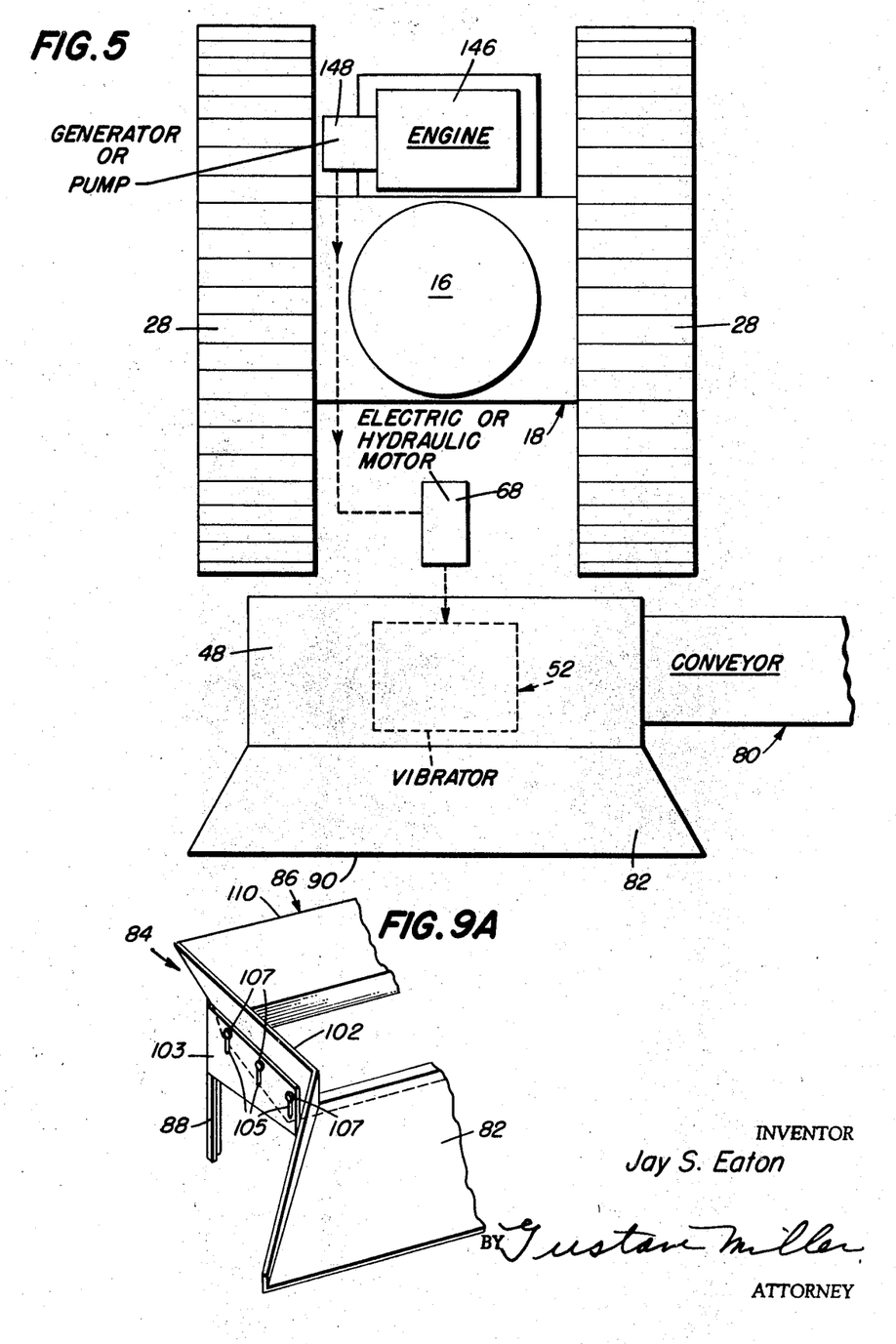
FIG. 5 is a schematic view of part of the invention.
FIG. 9A is a perspective view of the combined ramp and funnel shroud with an alternate form of feed opening control means.

An alternate manner of providing an adjustable opening to control the rate of flow from the feeding platform 48 to the elevating mechanism 80 is shown in FIG. 9A. Here, each end wall 102 of shroud 84 is provided with a vertically adjustable depending gate 103 having slots 105 through which bolts 107 extend into threaded apertures in end wall 102 for securing the gates in adjusted position over the selected feeding end of platform 48. The door 108 may still be used for closing off the non-feeding end of platform 48, and the door 108 at the feeding end may be omitted, and the adjustable gate 103 is adjusted to provide the feed opening desired.

To prevent spillage of material beyond the platform 48, the shroud 84 also has a rear sloping wall 110 connecting the funnel rear wall 94 to the top edge of the funnel transverse end walls 102. This shroud rear wall 110 may be made adjustable in height in the same manner as with the door 108 on platform 48 or the same as gate 103, above set forth, to accommodate different makes or sizes of draglines having different fairlead locations.

Figure 6:
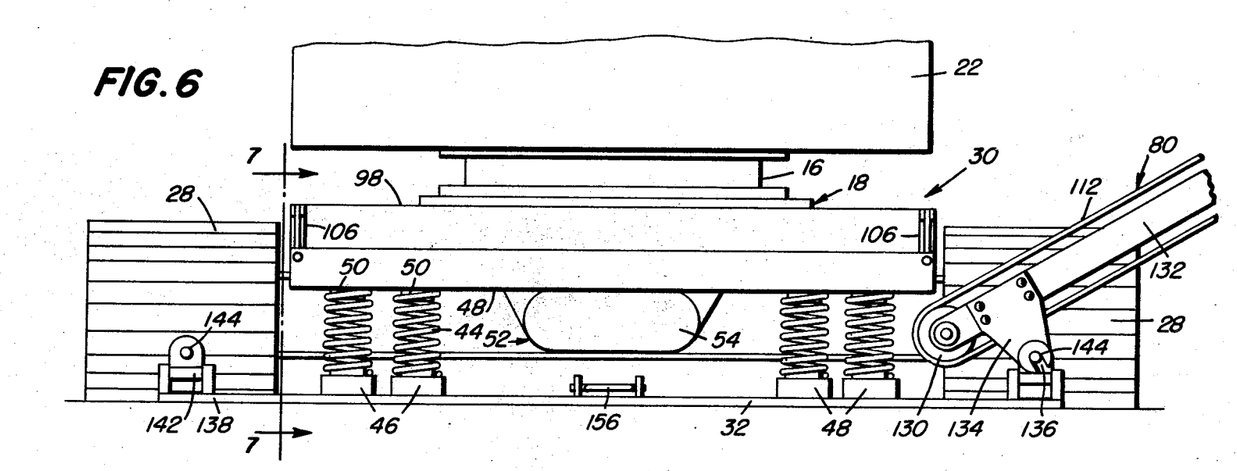
FIG. 6 is a front elevational view, on lines 6—6 of FIGS. 7 and 8, of the load feeding platform and actuating mechanism, the funnel and ramp shroud being omitted.
Figure 7:
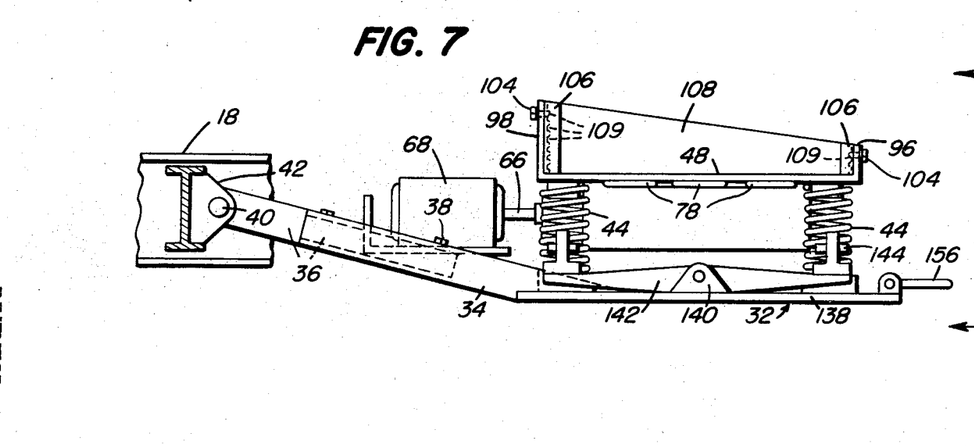
FIG. 7 is a detail sectional view on line 7—7 of FIG. 6.
Figure 8:
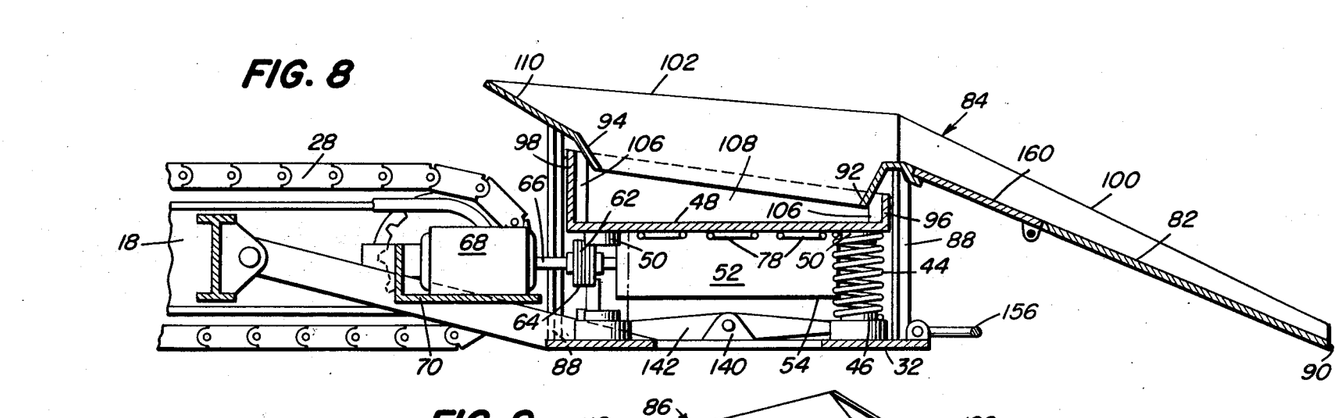
FIG. 8 is a sectional view on an enlarged scale, on line 8—8 of FIG. 3.

The elevator mechanism 80 includes an endless belt conveyor 112 which may be of conventional truss sections that are pin connected for quick change, either to replace a damaged section, or to vary the length of the belt conveyor 112. A gravity takeup 114 for the conveyor or belt 112 is located at an intermediate position, between the support legs 116 on a base 118 for the higher end of the elevating mechanism 80. The legs 116 may be made of extendable bars so as to be adjustable for a wide range of discharge heights. Beneath the upper discharge end of the belt conveyor 112 is positioned a material directing double spout 120 mounted on a scaffolding 122 whose legs may also be conventionally adjustable in height. The double spout 120 includes a material receiving funnel compartment 124 having two oppositely directed spouts 126 selectively connectable by a flop-over valve 127 so that the selected spout 126 will receive the material in funnel compartment 124 and discharge it to a selected truck 128 commencing immediately that the other truck has completed loading and continuing while such other truck is pulling away and while another empty truck is replacing it to receive the material as soon as the prior truck is completed loading. Obviously, the flop-over valve, or a gate valve, may operate not only to selectively open either discharge spout 126, but also to close both spouts at the same time, if material is dropped therein by the belt conveyor 112 when no truck 128 is present. The belt conveyor 112 is powered conventionally for operation over end rollers 130 between longitudinal frame members 132, additional intermediate rollers being provided as necessary. By varying the width of the feeder 30, belt conveyor 112, size of dragline 12 and scraper bucket 24 and double spout 120 and other associated parts, it is possible to handle from five hundred to five thousand tons of material per hour. The elevating mechanism 80 is positioned in cooperative relation to the feeder platform 48 by having the lower end of the conveyor extend under the selected end of the feeder platform 48 as shown in FIG. 6. Depending from adjacent the lower ends of the conveyor frame members 132 are a pair of bifurcated inverted cradle support stanchion plates 134 having inverted cradle recesses 136 of suitable depth, pivotally supported on the parallel transverse end pieces 138 of feeder base 32 by means of ears 140 are self leveling support arms 142 having cradle support pins 144 for receiving and supporting the bifurcated inverted recesses 136 of the inverted cradle support plates 134 thereon. This construction makes the support for the lower end of the belt conveyor 112 self leveling, as well as making it very quickly attachable and detachable, it being only necessary to just lower the cradle plates 134 over the cradle receiving support pins 144, instead of the longer procedure of connecting the plates 134 to the support arms by bolts and nuts through complementary apertures.

The vibrator motor 68 may be electrical, and powered from any suitable electricity source, which may also provide electricity for the feeder platform heater rods 78. An engine 146 on a suitable location on the dragline carriage 16 provides power as needed, operating a generator or pump 148 for the motor 68 which may be either electrical or hydraulic. When hydraulic, one of the dragline engines may supply electricity for the heater rods 78 when needed, or an outside source of electricity, if available, may be used. Obviously, a gasoline engine may also be used.

When one area of a cut is finished and it is necessary to move to a new cut area, the elevating mechanism 80 may be hooked onto the bucket 24 by means of hooks 150, pivoted to the support legs 116, and the double spout 120 may also be hooked onto the frame members 132, if the boom is of sufficient strength, by means of hooks 152 cooperating with a rod 154 extending through opposite sides of the frame members 132 in a suitable location so that the lower length of the belt conveyor 112 will more than counterbalance the empty weight of the double spout 120, and the entire unit may then be moved as a unit when the crawler is moved in the direction away from the ramp 82. Should it have to be moved in the direction toward the ramp 82, an eye 156, pivoted on the front piece 158 of feeder base 32 is accessible through a door 160 in the ramp 82, may be temporarily secured by a tie line attached to a suitable part of the dragline 26 for lifting the entire feeder mechanism with the shroud 84 thereon on its hinge pins 40 to prevent the forward ramp edge 90 from plowing into the ground. At the new location, the parts are set down in suitable position for quick continuation of the operation. Should the new location, necessitate that the elevator mechanism 80 be located on the opposite end of the feeder platform 48, it is merely set on such opposite side, the cradle plate being guided onto the cradle supporting pins 144 of the self leveling support arm 140 at the other end, and the feeder platform doors 108 and/or gates 103 are appropriately repositioned, and the vibrator 52 is adjusted or controlled to feed the material to the other selected end to the elevator mechanism 80 then at such location.

Summary of operation

In operation, an appropriate size of dragline and feeder unit is selected according to the capacity of the dragline on which it is operating. The entire combination dragline and material feeder and loader unit mechanism is assembled in location, as apparent from the foregoing description. Conventional power means and belt conveyor operating means are provided, with controls therefor either adjacent the lower end, or in the dragline cabin 22. The dragline operator in the cabin 22 drags the scraper bucket through the cut by means of the dragline or cable 26. When full, the dragline or cable 26 pulls the scraper toward and over the ramp 82 to the funnel 86 through which he tips the scraper bucket 24 to dump the load through the funnel 186 onto the feeder platform 48, then immediately returns the scraper bucket 24 to the cut to commence a new cycle. Meantime, simultaneously with the new bucket cycle, a loading cycle takes place as the vibrating feeder platform 30 feeds the material thereon to the selected end onto the lower end of the belt conveyor 112 of the elevating mechanism 80, which conveys it to the funnel compartment 124 of the double spout 120 whence it is gravity discharged by a selected spout 126 to the empty truck 128 thereunder. As soon as one truck 128 is filled, the flop over valve 127 is actuated to divert the material to the other spout 126 beneath which an empty truck 128 has meantime been located so that both cycles may take place simultaneously and continuously as long as the one cut area is being operated on, after which the entire mechanism may be readily moved to a new area as described.

Although this invention has been described in considerable detail, such description is intended as being illustrative rather than limiting, since the invention may be variously embodied, and the scope of the invention is to be determined as claimed.

Having thus set forth and disclosed the nature of this invention, what I claim is:

1. A combination scraper bucket dragline and material feeder unit (10) comprising a dragline (12) mounted on a crawler (18) and having a long boom (14) operatively extending therefrom, and a scraper bucket (24) operable by said boom (14) toward and away from said crawler (18); the improvement comprising a material feeder (30), hinge means (34, 36, 40 and 42) securing said feeder (30) to said crawler (18), and an integral funnel (86) and ramp (82) shroud (84) extending over said feeder (30) and having a ramp (82) extending forwardly therefrom for receiving material collected by said scraper bucket (24) and dragged over said ramp (82) and dropped through said funnel (86) onto said feeder (30), whereby the cycle of said scraper bucket (24) is confined to scrapingly collecting material and dragging it over said ramp (82) to drop through said funnel (86) onto said feeder (30) and then returned to commence a new cycle while the feeder goes through a cycle, simultaneous with the new cycle of the scraper bucket (24), of feeding the material dropped thereon, in the previous bucket cycle, for delivery to a suitable material transportation means (80 or 124), said feeder (30) including a material receiving means, under said funnel (86), extending transversely of said ramp (82), a material elevating mechanism (80), means (134–144) attaching said elevating mechanism (80) to said feeder (30) at one transverse (138) end thereof, and means (52) causing said feeder (30) to feed the collected material thereon to said material elevating mechanism (80) at one end thereof, said feeder including a base (32), a material feeding platform (48), means (44) yieldably supporting said platform (48) on said base (32), said feeder feed causing means including an eccentric vibrator (52) agitating said platform (48) to feed material thereon onto said material elevating mechanism (80).

2. The combination of claim 1, and adjustable means (104, 106, 108 and 109 or 103, 105 and 107) for controlling the rate of flow from one transverse end of said feeder platform (48) to said elevating mechanism (80) and for closing off the other non-feeding end of said platform (48).

3. The combination of claim 2, said adjustable means comprising a door (108), spaced tracks (106) on confronting side walls (96 and 98) of said platform (48), and securing means (104) adjustably positioning said door in said spaced tracks at either end of said feeder platform (48).

4. The combination of claim 2, said adjustable means comprising a gate (103) depending from an end wall (102) of said funnel shroud (84), and means (105 and 107) adjustably positioning said gate (103) on said funnel shroud end wall (102) over either end of said feeder platform (48).

5. The combination of claim 1, said feeder feed causing means (52) selectively (FIG. 11 and (68)) feeding the material thereon to either selected transverse end of said feeder platform (48).

6. The combination of claim 1, said elevating mechanism (80) comprising an endless belt conveyor (112), a frame (132) therefor, supporting stanchions (134) depending from said frame (132), a stanchion supporting arm (142) pivotally mounted (140) on one transverse end (138) of said feeder base (32), and means (136 and 142) pivotally supporting said supporting stanchions (134) on said pivoted arm (142), said pivoted arm (142) being self leveling.

7. The combination of claim 6, said supporting stanchions (134) each having an inverted cradle (136) at its bottom, said self leveling supporting arm (142) on said base (32) having pins complementary to said cradles detachably supporting said supporting stanchions (134) thereon.

8. The combination of claim 1, a lifting eye (156) secured on said feeder base (32) and an eye access door (160) in said ramp (82) over said eye (156).

9. The combination of claim 1, and means (78) for heating said feeder platform (48) to prevent material thereon from sticking thereto.

10. The combination of claim 1, said means (34-42) hingedly securing said feeder (30) to said crawler (18) comprising a pair of arms (34) rigidly extending from said feeder base (32), and hinge arms (36 or 36A) adjustably secured to said rigid arms (34).

11. The combination of claim 10, a motor supporting bridge (70) mounted on said rigidly extending arms (34), and a vibrator actuating motor (68) mounted on said bridge (70), said vibrator (52) being operatively secured to said material feeder platform (48).

12. The combination of claim 1, and means (different size springs 44) for selectively adjusting said yieldable means (44) to selectively slant said feeder platform (48) toward the selected transverse end.

13. The combination of claim 1, and a reversible power motor (68) for said eccentric vibrator (52) including a pair of shafts (56 and 58), said shafts being eccentrically weighted, and means (72-75 or 76) adjustably gearing said shafts (56 and 58) together.

14. The combination of claim 13, said adjustable gearing means comprising pin (73) and slot (75) connections between said shafts (56) and said gear means (72 and 74).

15. The combination of claim 14, said pin (73) and slot (75) connections extending approximately ninety degrees circumferentially.

References Cited

UNITED STATES PATENTS

| | | | |
|---|---|---|---|
| 1,520,652 | 12/1924 | Jenssen | 214—109 |
| 2,060,867 | 11/1936 | Hollerbach | 214—93 |
| 3,315,795 | 4/1967 | Ross et al. | 198—59 XR |

ROBERT G. SHERIDAN, Primary Examiner

U.S. Cl. X.R.

198—220; 214—41